United States Patent [19]
Koch

[11] Patent Number: 5,199,047
[45] Date of Patent: Mar. 30, 1993

[54] RECEIVER FOR A DIGITAL TRANSMISSION SYSTEM

[75] Inventor: Wolfgang Koch, Heroldsberg, Fed. Rep. of Germany

[73] Assignee: U.S. Philips Corporation, New York, N.Y.

[21] Appl. No.: 604,734

[22] Filed: Oct. 22, 1990

[30] Foreign Application Priority Data

Oct. 25, 1989 [DE] Fed. Rep. of Germany ....... 3935436
Jan. 20, 1990 [DE] Fed. Rep. of Germany ....... 4001592

[51] Int. Cl.$^5$ ......................... H03H 7/40; H04L 27/01
[52] U.S. Cl. ......................... 375/13; 375/96; 364/724.02
[58] Field of Search ......................... 375/13, 14, 94, 96; 364/724.02, 724.19, 724.2

[56] References Cited

U.S. PATENT DOCUMENTS

| | | | |
|---|---|---|---|
| 4,047,013 | 9/1977 | Milewski | 375/13 |
| 4,397,029 | 8/1983 | Satorius et al. | 375/14 |
| 4,674,103 | 6/1987 | Chevillat et al. | 375/13 |
| 4,733,402 | 3/1988 | Monsen | 375/14 |
| 5,031,193 | 7/1991 | Atkinson et al. | 375/96 |

Primary Examiner—Curtis Kuntz
Assistant Examiner—Young Tse
Attorney, Agent, or Firm—Leroy Eason

[57] ABSTRACT

A receiver for a digital transmission system in which transmitted data contain a training data sequence, and the receiver stores a copy of that sequence as it was transmitted. A channel impulse response is estimated based on this stored copy. The received training data sequence is compared with a version of the stored copy that has been modified by the estimated impulse response, and an estimate of the receiving quality is formed based on the degree of match with the modified version.

17 Claims, 4 Drawing Sheets

RECEIVER FOR A DIGITAL TRANSMISSION SYSTEM

BACKGROUND OF THE INVENTION

1. Field of the Invention

The invention relates to a receiver for a digital transmission system, in which transmitted data contain a training data sequence from which a channel impulse response for the transmit channel is estimated in a channel estimator with the aid of a training data sequence stored in the receiver.

2. Description of the Related Art

Receivers of such a type will be used, for example, in the future Pan-European mobile radio system. In this mobile radio system speech signals are co-transmitted in digitized form with other digital signals according to a time-division multiple-access method. A transmitter of the mobile radio system transmits these data which are appropriately modulated. As a result of reflections and multipath propagation on the transmission path, the transmitted signal reaches the receiver in various superposed signal portions which have different delays and phase shifts. This phenomenon distorts the transmitted signal. These distortions cause the data symbols contained in the received signal to be influenced by preceding data symbols (intersymbol interference).

To detect the originally transmitted data symbols it is necessary to eliminate these distortions by means of equalization. For this purpose a channel characteristic that describes the transmission path may be provided as a predetermined value to an adaptive equalizer. However, the transmission path between transmitter and receiver and consequently, also the channel information describing each transmission path, are changed continuously as a result of changes of location of the mobile radio receiver. Therefore, this channel characteristic is re-determined each time by means of a channel measurement to be performed for each time slot. For this purpose, a training data sequence having constant data contents is used, with the data contents of the training data sequence being stored in each receiver. This training data sequence is embedded in each transmitted data sequence. A channel estimator arranged in each receiver estimates a channel impulse response by processing the training data sequence received in a distorted manner and the training data sequence stored in undistorted form, which response is applied to the equalizer.

The measurement of the quality of the received signal is a major factor in the estimation of the received signal. For estimating this receiving quality there are possibilities especially known from analog circuit designs. For example, the signal strength (field strength measurement) or a signal-to-noise ratio may be selected. In DE-OS 34 27 473 to which U.S. Pat. No. 4,578,819 corresponds, for receiving space-division transmitted analog radio signals, in which the signal-to-noise ratio is measured in a manner so that the demodulated audio signal is applied to a high-pass filter. The amplitude ratio of the high-pass filtered analog signal (noise components) to that of the unfiltered analog signal provides a voltage that approximately corresponds to the signal-to-noise ratio.

Analog measuring methods of this type are suitable for evaluating a digital receiver only to a limited extent, for example, due to the large frequency bandwidth of a digital signal.

For estimating the receiving quality of input signals to be processed digitally, the measurement of the bit error rate of the detected data symbols would particularly correspond to the selected signal processing. However, this is very costly.

SUMMARY OF THE INVENTION

It is an object of the present invention to provide a significant estimation of the receiving quality in a receiver of the type mentioned in the opening paragraph in a most simple manner.

This object is achieved in that an estimated sequence for the received training data sequence is determined by means of the estimated channel impulse response on the basis of the training data sequence stored in the receiver, and in that the degree of match of the estimated training data sequence with the received training data sequence is determined.

An estimation criterion calculated by means of the degree of match of the estimated training data sequence with the received training data sequence is advantageous in that not only the receiving quality as such but also the possibility to equalize the received signal is estimated. Since this estimation criterion depends both on the actual channel properties of the transmission channel and on the channel estimator used, this estimation criterion therefore expresses how well the detected channel property of the transmission channel can be duplicated with the given channel estimator. The better the replica turns out to be, the better in most cases will the detected data sequence correspond to the originally transmitted data sequence, whereas an exact copy of the transmission channel is impossible were it not for the noise signals occurring in a statistically distributed manner in the transmission channel.

To check the degree of match of the estimated training data sequence with the received training data sequence it is advantageous to fold the stored training data sequence, if possible after remodulation, with the estimated channel impulse response. To express the degree of match of the estimated training data sequence with the received training data sequence in a time slot an estimate Q is formed which describes the receiving quality. A simple possibility to form this estimate Q is to calculate the sum of the squared distances between corresponding pairs of elements of the estimated and received training data sequences.

It is particularly advantageous for forming the squared distances, to take into consideration only one number of elements taken from the middle of the training data sequence. This achieves that only the elements of the result of the folding which are influenced by the training data sequence are taken into consideration for the comparison.

An estimation criterion formed in this manner is particularly suitable for a diversity receiver which comprises at least two receive loops and a decision circuit for selecting one of these two receive loops, while such an estimation criterion is formed for each receive loop. Since also the training data sequences stored in the receiver can be referred to for producing the estimation criterion, a complete equalization of the received signals is not necessary. Therefore, in a particularly advantageous manner, the signal which is more favourable according to the estimation criterion can first be selected without the received signals being equalized so that, subsequently, only this single signal needs to be equalized.

BRIEF DESCRIPTION OF THE DRAWING

The invention will now be further explained and described with reference to the exemplary embodiments shown in the drawing, in which.

DETAILED DESCRIPTION OF THE PREFERRED EMBODIMENTS

Figure 4:
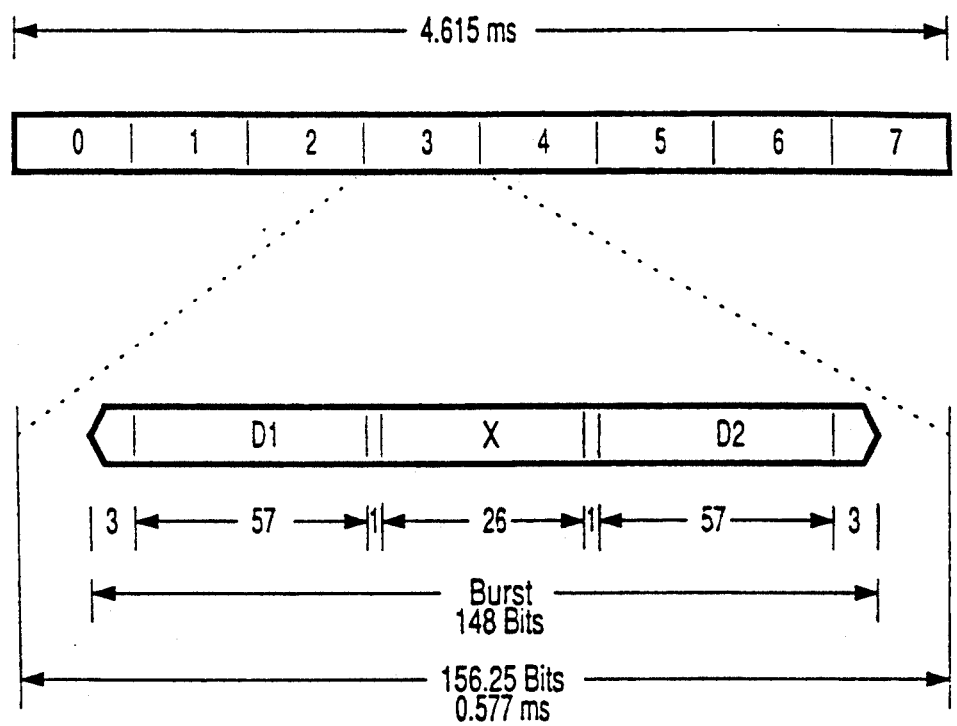
FIG. 4 shows a signal frame of a time-division multiple-access channel and a time slot having useful data sub-sequences and training data sequences.

As an exemplary embodiment, a radio transmission system is described which is suitable for use in a future Pan-European mobile radio system. This system comprises 124 frequency channels having a frequency range from 890 to 915 MHz for the transmission between a mobile station and a base station or, in the opposite direction, the frequency range from 935 to 960 MHz for the transmission between base station and mobile station. Each frequency channel has a time-division multiple-access structure which is represented in the top half of FIG. 4 as a signal frame having eight time slots 0, . . . , 7. A time slot may contain a so-called normal burst, a frequency correction burst, a synchronisation burst or an access burst. In the bottom half of FIG. 4 a normal burst as used for transmitting useful data symbols is represented as time slot 3. One of these useful data sequences may, for example, be part of a digitized speech signal. The useful data symbols are embedded in the time slot between two useful data sub-sequences D1 and D2. In the middle of the time slot a training data sequence X is embedded between the useful data sub-sequences D1 and D2. At the beginning of the first useful data sub-sequence and at the end of the second useful data sub-sequence there are three more bits which may also be used for equalizing the useful data sub-sequences. A bit inserted on the left and right of the training data sequence does not have any significance in this context. The complete burst, however, is shorter than the signal frame time slot appropriated to the burst, in order to be able to equalize burst allocation errors and delay differences in the transmit channel, so that in this manner an overlapping of adjacent bursts transmitted by different mobile stations is avoided.

The data contents of the time slot are modulated in a transmitter 1 by means of a Gaussian Minimum Shift Keying (GMSK) technique. Because of this, and because of the transport through a dispersive transmission channel, data signals arrive at the receiver, in which the original data symbols b cannot be retraced. If necessary, estimation ranges can be provided, in which the data signals can be assigned to the originally transmitted data symbols and training signals can be assigned to the originally transmitted training data symbols. In order to detect the originally transmitted data symbols, the distortions of the dispersive transmission channel and the signal distortions deliberately introduced by means of the selected modulation are to be eliminated in a suitable receiver 2.

A carrier-frequency input signal received by a receiver 2 is first converted into the baseband by means of a quadrature mixer (not shown) after the signal has passed through an input stage 20 in which it has been amplified and selected. The quadrature signals produced by the quadrature mixer are sampled by means of a sample-and-hold circuit 21 and converted into digital values $Z = z_0, \ldots z_j$ by means of an analog-to-digital converter 22. The sequence of the sample values of the training data sequence X contained in the sample values Z will be referenced X' in the following. The conversion of the received signals into the digitized samples enables a digital signal processing. The digitized sample values are stored in a first random access memory (RAM) by means of a synchronizing arrangement (not shown) for the duration of the time slot to be processed by the receiver concerned. The period of time till the arrival of the next time slot to be processed can now be used for further processing the sample values available in the RAM.

The digital signal processing consists of the equalization and demodulation and the time-division correlative channel estimation required for this purpose. In the exemplary embodiment a Viterbi equalizer 25 is used for the purpose of equalization and demodulation, which equalizer recovers in the receiver the digital useful information signals transmitted by the transmitter from the sample values stored in the RAM 23 while utilizing the information of the actual channel characteristic.

A channel estimator 24 estimates the training signal contained in each time slot. Copies of the originally transmitted data symbol sequences of the training data are stored in a read-only memory (ROM) 26 in each receiver. The training data sequence is selected so that it has a pulse-like autocorrelation function. In this manner the channel estimator 24 can easily locate the position of the training data sequence in the received signal by means of conventional algorithms. The structure of this type of channel estimator for a Viterbi equalizer is described, for example, in the paper entitled "Bit synchronization and timing sensitivity in adaptive Viterbi equalizers for narrow band TDMA digital mobile radio systems", by A. Beier, G. Heinrich, U. Wellens, IEEE Vehicular Techn. Conf., Philadelphia, 15–17 June 1988, pp. 377–384.

Through the dispersive transmission channel, signals $r(t-t_1)$, $r(t-t_2)$, ..., that have different delays $t_1, t_2, \ldots$, compared to a signal $r(t)$ originating from the transmitter, are superposed at the receiver. This leads to linear distortions. After a specific amount of time which depends on the characteristic of the transmission channel, the influence of the signal portions arriving at the receiver in a delayed manner is no longer important and need no longer be taken into account for the equalization. Advantageously, the delay to be taken into account can be denoted as a number n of data elements transmitted within this period of time. By means of cross-correlation of the distorted training data sequence X' contained in the input signal with the undistorted training data sequence X stored in the ROM 26, the channel estimator 24 determines a channel impulse response H(O) which is composed of various parameters $h_0(O) \ldots h_k(O)$. The number $k+1$ of the parameters is thereby equal to the number n of data symbols to be taken into account for the equalization, when it is assumed that there is one sample value per transmitted data symbol. This estimated channel impulse response H(O) is applied to the Viterbi equalizer 25 as a vector of input parameters.

In order to form an estimation criterion of the receiving quality of received signals, the channel impulse response H(O) is applied to an arrangement 27 for folding data sequences. To a further input of the arrangement 27 for folding data sequences 27 is applied the training data sequence $X = x_1, \ldots, x_m$ stored in the ROM 26. The arrangement 27 for folding data sequences 27 folds the training data sequence X with the channel impulse response H(O) into a sequence $Y = y_1, \ldots, y_{k+m-2}$ with $$y_i = \sum_{n=0}^{k+m-2} x_n h_{i-n}. \tag{1}$$

Folding the training data sequence X with the channel impulse response H(O) thus provides an estimate Y for the undistorted received signal portion that contains the training data sequence. This denotes that only those distortions are copied which are caused by the signal passing through the dispersive transmission channel. Further disturbances like, for example, noise are disregarded for this estimation.

Figure 1:
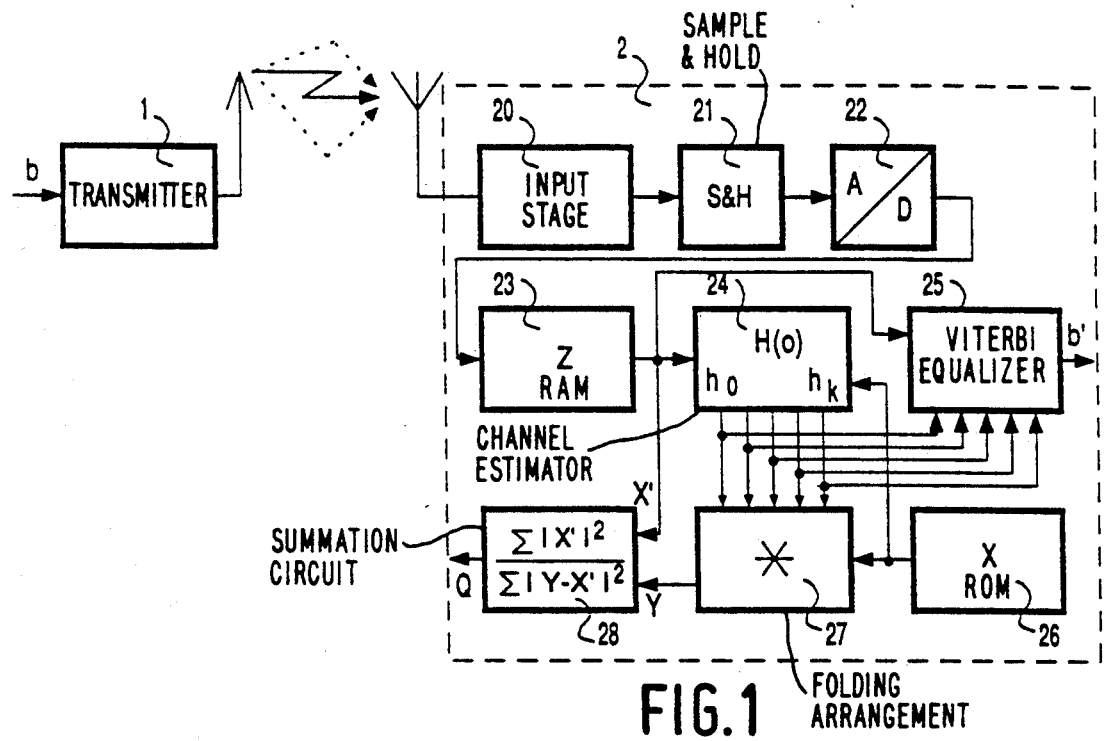
FIG. 1 shows a radio transmission system comprising an arrangement for estimating a received signal.
Figure 2:
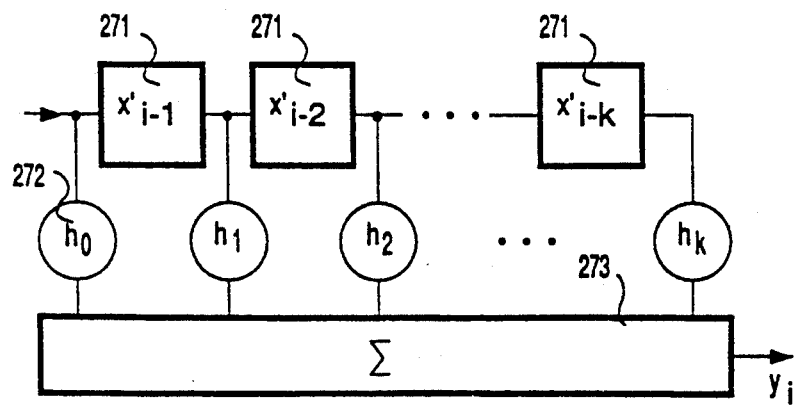
FIG. 2 shows a transversal filter for folding an impulse response of a transmission channel with a stored training data sequence.

FIG. 2 shows a transversal filter which may suitably be used for producing the folding result. In this transversal filter the individual elements of the training data sequence are written clock-serially. The transversal filter comprises a series of connected individual register cells 271, with the input of a register cell always being connected to a preceding register cell, i.e. the input thereof, and in this manner a shift register is formed. The input of the transversal filter, i.e. the output of the register cells 271, is multiplied by the contents of second register cells 272 in which the coefficients $h_0, \ldots h_k$ of the channel impulse response H(0) are stored. The outputs of all multiplier cells are combined by a summation circuit 273 and produce a sub-element $y_i$ of the training data sequence Y to be estimated.

In a summation circuit 28 the difference between I elements of the actually received training data sequence X' and the estimate of the training sequence Y described hereinbefore is determined. For this purpose, each individual element $y_i$ is assigned to each sample value $x'_i$ from the received signal, and the elements $y_i, x'_i$ assigned to each other are subtracted from each other. After the subtraction the difference between the two elements $y_i, x'_i$ assigned to each other is multiplied by their own values. By summing the thus formed squared differences of matching elements, an estimate S is obtained which denotes the receiving quality of the received signal $$S = \sum_0^i s_i = \sum_0^I |y_i - x'_i|^2. \tag{2}$$

The smaller the estimate S, the better the estimated training data sequence corresponds to the appropriate portion of the received signal comprising the training data sequence. When assuming that the channel impulse response is constant within a time slot, it is permissible to use the estimate S also as an estimate for the remaining sample values of the received signal of a time slot. The smaller the estimate S, the greater the probability that the originally transmitted data bits can be detected by subsequent equalization of the signal. This estimate S takes into account, for example, that heavily distorted signals may be equalized better by means of a proper estimate of the channel impulse response than a slightly distorted signal for which only a single channel impulse response suitable under certain conditions can be estimated. This estimate also implicitly takes into account the noise introduced along the transmission path. Noise cannot be taken into account by the channel estimator and, consequently, leads to worse results of the estimation which thus lead to higher estimates.

The estimate S is an absolute magnitude. In some cases a relative estimate may even be more suitable for judging the receiving quality, in which estimate the power of the received signal is related to the estimate S or a magnitude derived therefrom. In an improved embodiment of the invention the quality factor Q is determined for which the energy contents of the received training data sequence X' is related to the estimate S.

$$Q = \frac{\Sigma |x'_i|^2}{S} = \frac{\Sigma |x'_i|^2}{\Sigma |y_i - x'_i|^2} \tag{3}$$

In order to determine the energy contents of the received training data sequence X' the squared values of the individual elements $x'_i$ of this sequence are summed. The higher the quality factor Q the more disturbance-free was the reception of the training data sequence. In this manner the quality factor Q is independent of the received field strength. It is a measure of the mean signal-to-noise ratio in the time slot under consideration.

For completeness' sake it should be observed that estimation criterion equivalent to the quality factor Q can be obtained when the sum of the squared values $|y|^2$ of the estimated training data sequence Y is related to S.

This is advantageous in that the calculation of the sum of the squared values of Y can be simplified in accordance with the following equation;

$$|Y|^2 = C \cdot \sum_{i=0}^{k} |h_i|^2 \tag{4}$$

where the constant C is a value depending on the training data sequence X. The calculation of the squared values in accordance with equation (4) requires fewer calculation steps than an explicit calculation of $y_i$ in accordance with equation (1) and its subsequent squaring.

In the received training data sequence the first k elements of the sample values of the training data sequence are influenced by data symbols of the useful data sub-sequences preceding the training data sequence. Therefore, in an improved embodiment only the elements $y_k, \ldots, y_{m-2}$ are produced and compared to the corresponding sample values when the folding is performed for producing the estimate Y. In this manner the estimate S or the quality factor Q only depends on the elements of the training data sequence. In a training data sequence of similar length it may also be useful in view of calculating time to use even fewer elements for the comparison and nevertheless obtain a sufficiently suitable estimate S or quality factor Q.

According to linear modulation methods such as, for example, the GMSK modulation used in the exemplary embodiment, the distortions deliberately introduced by the modulation are eliminated by the channel estimator. According to non-linear modulation methods the training data signal is first to be modulated in the same manner as at the transmission end before it is applied to the arrangement 27 for folding the data sequences. In this case it is advantageous to store a modulated signal already in the receiver so as to save on modulation circuitry.

Figure 3:
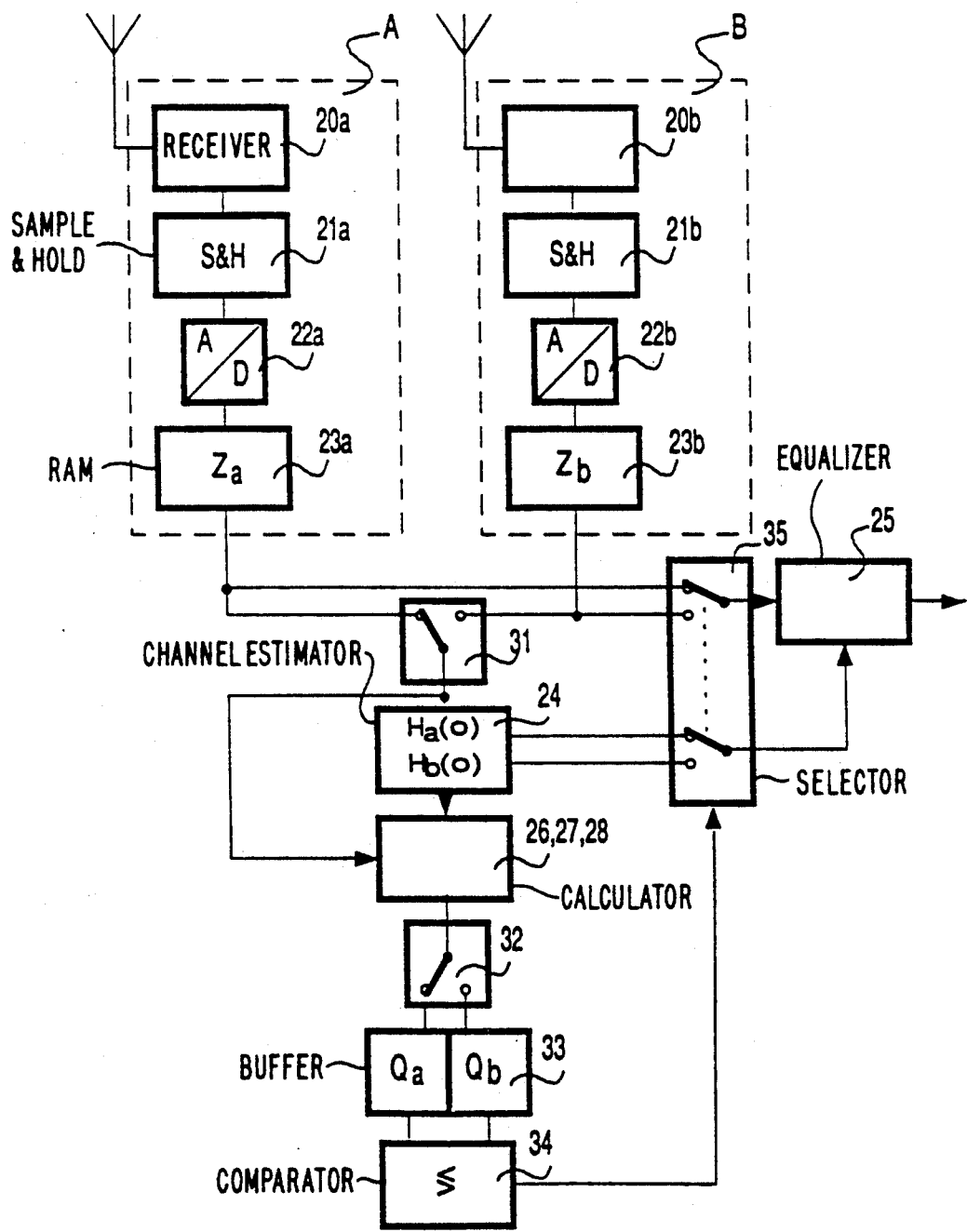
FIG. 3 shows a diversity receiver.

In an exemplary embodiment represented in FIG. 3 the determined quality factor Q is used in a diversity receiver. In this diversity receiver two complete receive loops A and B are structured, a receive loop consisting of the receive section 20, the sample-and-hold circuit 21, the analog-to-digital converter 22 and the RAM 23. By means of a control circuit (not shown) first the sample values buffered in the RAM 23a of the first receive loop are applied to the single channel estimator 24. The channel impulse response $H_a(0)$ produced thereby is buffered and used for calculating the quality factor $Q_a$ of the first receive loop A. The calculated quality factor $Q_a$ is buffered in a first estimate buffer 33. Thereafter, the channel impulse response $H_b(0)$ and the quality factor $Q_b$ of the second receive loop B are calculated accordingly. These consecutive calculations are symbolically shown in FIG. 3 by means of change-over switches 31, 32. By means of a comparator 34 it is then established which of the two quality factors $Q_a$, $Q_b$ has the smaller value of the two and the channel impulse response H(0) and the sample values of the better receive loop are applied to the likewise single equalizer 25 through selecting circuit 35 represented symbolically as a switch.

In contradistinction to the circuit arrangements of diversity receivers switching on the basis of estimation criterions of analog signals, it is ensured with this diversity receiver that the signal is selected which is more suitable for the digital signal processing, i.e. the signal from which a better replica of the originally transmitted data sequence can be expected when compared to the other signal. The decisive advantage here is that for selecting the better of the two signals, these signals are not to be equalized completely as, for example, would be the case if for each receive loop a bit error rate were recovered from the completely processed signal.

For calculating the quality factor Q signal processors, as are also commonly used for the channel estimator 24 and for data bit equalization and detection, are preeminently suitable for calculating the estimate because of the digital sample values and the arithmetic operations with the sample values and the known values of the training data sequence. The circuitry for calculating the estimate is relatively restricted compared to the circuitry for the channel estimator and the equalizer, so that the calculation of the quality factor can be performed by the same signal processor which also performs the channel estimation and the equalization.

As a signal processor can be used, for example, the signal processor marketed by AT&T under the type of DSP 16A. Hardware structure and software of this signal processor can be learnt from the data and proposed applications for this signal processor.

Figure 1A:
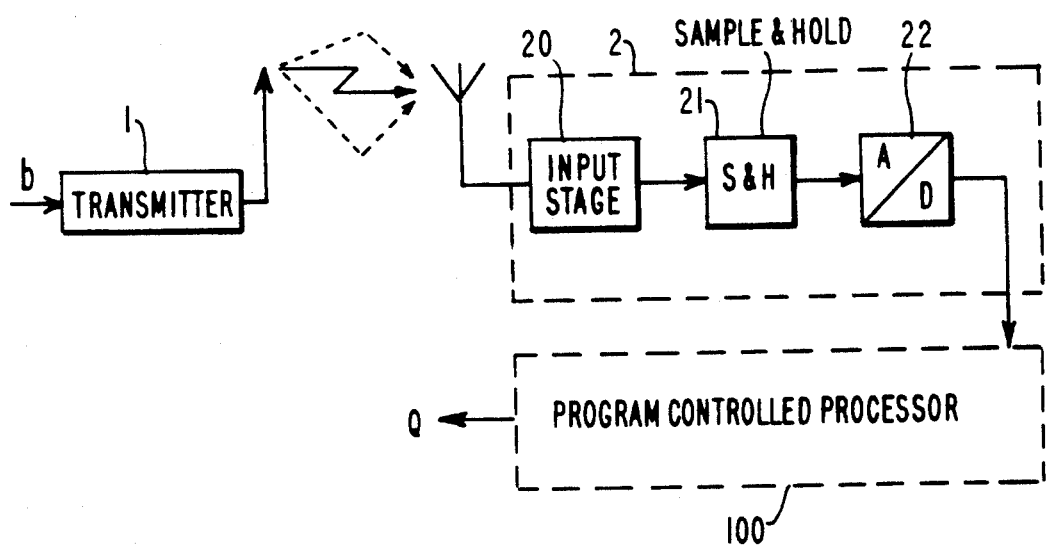
FIG. 1A shows a further embodiment using a program-controlled processor for storing and estimating functions.

In the exemplary embodiment shown in FIG. 1A for a digital receiver comprising a signal processor, the functions of the channel estimator 24, the Viterbi equalizer 25, the arrangement 27 for folding the data sequences and the summation circuit 28 described with reference to the first exemplary embodiment are performed by the signal processor 100. The digitized sample values delivered by the analog-to-digital converter are buffered in a sub-area of a random access memory (RAM). When implementing the receiver concept described hereinbefore comprising a quadrature mixer, both the I and Q components of each sample value are stored in the RAM. In the next stage the signal processor determines the channel impulse response H(0) in a known manner by means of cross-correlation of the sample values Z stored in the RAM with the training data sequence X stored in the ROM. The determined channel impulse response H(0) is buffered in a different area of the RAM. For a calculation of the estimation criterion first the training data sequence X is folded with the just determined channel impulse response H(0). The folding of the two data sequences is then performed in accordance with the calculation instruction expressed by equation (1). The individual elements of the data sequences obtained in this manner are buffered in a further sub-area of the RAM. Subsequently, in accordance with the calculation instruction expressed by equation (2), the assignable elements of the estimated training data sequence Y are subtracted from the elements of the received training data sequence X', squared and added together to form the estimate S. The energy contents of the received training data sequence X' are determined according to equation (3) and divided by the estimate S. After the signal processor has calculated the quality factor Q in the manner described hereinbefore, it proceeds in known manner with the further digital signal processing of the received data.

In a receiver presenting diversity reception the signal processor determines for each receive branch A, B its appropriate estimation criterion $Q_A$, $Q_B$ respectively. Since the same calculation is to be performed for estimation criterion Q and only the input data, i.e. the sample values of the receive branch A or B are different, it is advantageous to perform the calculation of the estimation criterion as a sub-program for the program-controlled processor and to use the sample values of the receive branches A and B as parameters the determined quality factors $Q_a$ and $Q_b$ respectively, are buffered in a random access memory in order to be compared to each other. Depending on which of the two quality factors is the greater, the sample values $Z_a$ of the receive branch A and the sample values $Z_b$ of the receive branch B are selected and used as variables for the further digital signal processing known per se by the signal processor.

The estimate S formed from the received training data sequence X' and the estimated training data sequence Y can preferably be used in methods of signal equalization, in which the individual equalized data elements of a data sequence are assigned a reliability information signal $L(b'_i)$ for each detected data symbol $b'_i$. This reliability information $L(b'_i)$ is a measure for the probability with which the equalizer has decided on each data symbol $(b'_i)$. By forming a relative value from this reliability information $L(b'_i)$ and from each estimate S of a time slot, the decision of the equalizer is estimated together with the quality factor of the received signal (cf. for example German Patent Application No. 39 11 999.8 to which U.S. Pat. No. 5,119,400 corresponds). This is particularly advantageous when data blocks are protected by means of channel encoding and distributed over various time slots (interleaving) in the future Pan-European mobile radio system mentioned hereinbefore. By means of this transmission redundancy any more probable data symbol can then be selected. When standardizing the reliability information $L(b'_i)$ at S, the reliability of the channel decoding in so-called soft decision decoding is considerably enhanced.

It will be self-evident that the described formation of the quality factor is not restricted to digital radio transmission systems only. Also with wire-bound data transmission, for example, through glass fibres or coaxial cables, signal distortions occur which lead to input signals that have different receiving qualities. Also in these transmission systems an estimate or quality factor featuring the receiving quality can be determined in the manner described hereinbefore.

I claim:

1. A receiver for data transmitted over a transmission channel in which data as transmitted contain a transmitted training data sequence (X), wherein the receiver comprises means for receiving data including data symbols (b') and a received training data sequence (X'), means for storing a copy of said transmitted training data sequence, and means for estimating a channel impulse response (H(0)) for said transmission channel based on said received training data sequence,
characterized in that said means for estimating comprises:
means for determining an estimated sequence (Y) based on the estimated channel impulse response and said copy of the transmitted training data sequence, and
means for determining a degree of match of said estimated sequence with said received training data sequence.

2. A receiver as claimed in claim 1, characterized in that said means for determining an estimated sequence (Y) folds said copy of the transmitted training data sequence with the estimated channel impulse response.

3. A receiver as claimed in claim 2, characterized in that for the degree of match an estimate (S) is formed which describes the receiving quality.

4. A receiver as claimed in claim 3, characterized in that the estimate (S) is formed from a sum of the squared differences between corresponding elements of the estimated sequence (Y) and the received training data sequence (X').

5. A receiver as claimed in claim 4, characterized in that for the formation of the squared differences a number of elements are taken from the middle of the estimated and the received training data sequences (Y, X').

6. A receiver as claimed in claim 5, characterized in that the receiver comprises at least two receive loops (A, B),
means for sampling one of said loops to provide sample values ($Z_a$, $Z_b$),
means for calculating estimation criteria ($S_a$, $S_b$) characteristic of the receiving quality, and
means, responsive to said estimation criteria, for selecting said sample values of one of said receive loops for further signal processing.

7. A receiver as claimed in claim 1, characterized in that said means for determining a degree of match provides an estimate (S) which describes receiving quality.

8. A receiver as claimed in claim 7, characterized in that said means for estimating further comprises means for determining an energy content of said received training data sequence, said energy content being based on a summation of squared values of individual elements $X'_i$ of said received training data sequence (X'); and said estimate (S) is weighted in accordance with said energy content.

9. A receiver as claimed in claim 7, comprising means for detecting said data symbols (b'),
characterized in that the receiver comprises means for forming reliability information for said detected data symbols weighted by said estimate (S).

10. A receiver as claimed in claim 9, comprising a program-controlled processor, characterized in that said estimate (S) is determined by said processor.

11. A receiver as claimed in claim 10, characterized in that said processor is a signal processor, and
said means for estimating and said means for determining an estimated sequence form part of said signal processor.

12. A receiver as claimed in claim 7, comprising means for detecting said data symbols (b'),
characterized in that the receiver comprises means for determining a quality factor Q based on energy content of said received training data sequence (X'), divided by said estimate (S).

13. A receiver as claimed in claim 12, comprising a program-controlled processor, characterized in that said estimate (S) is determined by said processor.

14. A receiver as claimed in claim 13, characterized in that said processor is a signal processor, and
said means for estimating and said means for determining an estimated sequence form part of said signal processor.

15. A receiver as claimed in claim 1, characterized in that the receiver comprises at least two receive loops (A, B),
means for sampling one of said loops to provide sample values ($Z_a$, $Z_b$),
means for calculating estimation criteria ($S_a$, $S_b$) characteristic of the receiving quality, and
means, responsive to said estimation criteria, for selecting said sample values of one of said receive loops for further signal processing.

16. A receiver for data transmitted over a transmission channel in which data as transmitted contain a transmitted training data sequence (X), wherein the receiver comprises means for receiving data including data symbols (b') and a received training data sequence (X'), means for storing a copy of said transmitted training data sequence, and means for estimating a channel impulse response (H(0)) for said transmission channel based on said received training data sequence,
characterized in that said means for estimating comprises:
means for determining an estimated sequence (Y) based on the estimated channel impulse response and said copy of the transmitted training data sequence, and
means for forming a sum of squared differences between corresponding elements of said estimated sequence and said received training data sequence, and determining a degree of match of said estimated sequence with said received training data sequence based on said sum.

17. A receiver as claimed in claim 16, characterized in that said corresponding elements are taken from the middle of said estimated and said received training data sequences.

* * * * *